US009034950B2

(12) United States Patent
Mihara et al.

(10) Patent No.: US 9,034,950 B2
(45) Date of Patent: May 19, 2015

(54) RUBBER COMPOSITION AND PNEUMATIC TIRE

(75) Inventors: Satoshi Mihara, Kanagawa (JP); Katsunori Shimizu, Kanagawa (JP); Keisuke Maejima, Kanagawa (JP); Yayoi Akahori, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 13/817,493

(22) PCT Filed: Aug. 19, 2011

(86) PCT No.: PCT/JP2011/068771
§ 371 (c)(1),
(2), (4) Date: Feb. 18, 2013

(87) PCT Pub. No.: WO2012/023607
PCT Pub. Date: Feb. 23, 2012

(65) Prior Publication Data
US 2013/0150512 A1 Jun. 13, 2013

(30) Foreign Application Priority Data
Aug. 20, 2010 (JP) ................................ 2010-184688

(51) Int. Cl.
| C08K 5/12 | (2006.01) |
| B60C 1/00 | (2006.01) |
| C08K 5/00 | (2006.01) |
| C08K 5/14 | (2006.01) |
| C08L 7/00 | (2006.01) |
| C08L 9/00 | (2006.01) |
| C08L 9/06 | (2006.01) |
| C08K 3/04 | (2006.01) |

(52) U.S. Cl.
CPC ................ C08K 5/12 (2013.01); B60C 1/0016 (2013.01); C08K 5/0016 (2013.01); C08K 5/14 (2013.01); C08L 7/00 (2013.01); C08L 9/00 (2013.01); C08L 9/06 (2013.01); C08K 3/04 (2013.01)

(58) Field of Classification Search
CPC ............... C08L 9/00; C08L 9/06; C08L 7/00; C08K 5/0008; C08K 5/01; C08K 3/04
USPC .................... 523/351; 524/285, 570
See application file for complete search history.

(56) References Cited

U.S. PATENT DOCUMENTS

| 4,373,069 | A | * | 2/1983 | Bond et al. .................. 525/237 |
| 5,589,526 | A | | 12/1996 | Sienel et al. |
| 5,614,592 | A | | 3/1997 | Van Drunen et al. |
| 6,326,426 | B1 | * | 12/2001 | Ellul ........................... 524/270 |
| 6,506,849 | B1 | * | 1/2003 | Hojo et al. .................. 525/332.7 |
| 7,326,745 | B2 | * | 2/2008 | Vasseur ....................... 524/105 |
| 7,795,356 | B2 | * | 9/2010 | Mihara et al. .............. 525/331.3 |
| 8,362,118 | B2 | * | 1/2013 | Mihara ......................... 524/77 |
| 8,445,572 | B2 | * | 5/2013 | Matsuda et al. ............. 524/238 |
| 2005/0171282 | A1 | * | 8/2005 | Park ........................... 525/191 |
| 2010/0256275 | A1 | * | 10/2010 | Lopitaux ..................... 524/285 |
| 2013/0172443 | A1 | * | 7/2013 | Kushida et al. ............. 523/156 |

FOREIGN PATENT DOCUMENTS

| DE | 44 37 465 A1 | 4/1996 |
| JP | 4-170449 A | 6/1992 |
| JP | 07-165990 A | 6/1995 |
| JP | 8-511051 A | 11/1996 |
| JP | 9-324076 A | 12/1997 |
| JP | 11-323024 A | 11/1999 |
| JP | 2000-169628 A | 6/2000 |
| JP | 2001-019773 A | 1/2001 |
| JP | 2002-114869 A | 4/2002 |
| JP | 2006-089552 A | 4/2006 |
| JP | 2011-105848 A | 6/2011 |
| WO | 94/29372 A1 | 12/1994 |
| WO | 01/04200 A1 | 1/2001 |
| WO | WO 0104200 | * 1/2001 |

OTHER PUBLICATIONS

"Hexamoll Dinch." Technical Data Sheet, Jan. 2013, pp. 1-2.*
German Office Action issued May 30, 2014 in the corresponding DE Patent Application 11 2011 102 762.1 with the English translation thereof.

* cited by examiner

*Primary Examiner* — Hannah Pak
(74) *Attorney, Agent, or Firm* — Carrier Blackman & Associates, P.C.; Joseph P. Carrier; Anne G. Sabourin

(57) ABSTRACT

The purpose of the present invention is to provide a rubber composition with which it is possible to produce a tire that retains wear resistance and has excellent frictional force on ice, and a pneumatic tire using the rubber composition. The rubber composition of the present invention is a rubber composition comprising a diene rubber, carbon black and/or a white filler, and a master batch prepared by premixing a non-diene rubber and an organic peroxide, wherein a total content of carbon black and white filler is from 20 to 70 parts by mass per 100 parts by mass of diene rubber and a content of the non-diene rubber in the master batch is from 3 to 30 parts by mass per 100 parts by mass of the diene rubber.

2 Claims, 1 Drawing Sheet

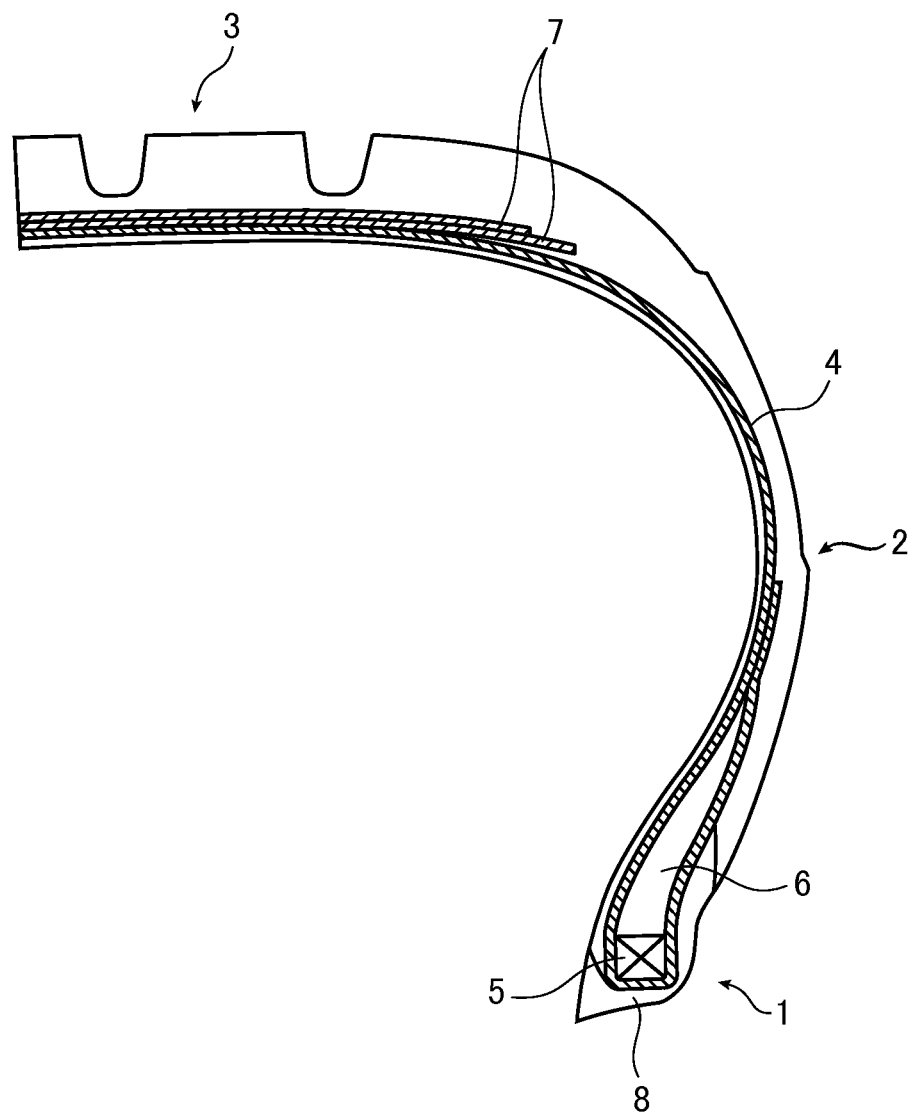

RUBBER COMPOSITION AND PNEUMATIC TIRE

TECHNICAL FIELD

The present invention relates to a rubber composition and a pneumatic tire.

BACKGROUND OF THE INVENTION

Technology whereby unevennesses are formed on the surface of a tread portion by adding a fine substance to a rubber material is known as a means for increasing the frictional force on ice of a studless tire (for instance, refer to Patent Documents 1 to 3).

With this technology, frictional force on ice is enhanced by unevennesses formed on the surface of a tread portion that drain the water film generated on the ice surface under high temperatures and scratch the surface of the ice under low temperatures. However, this technology is incapable of adequately guaranteeing the frictional force on ice of prior art, and even brings about a reduction in wear resistance. Therefore, further improvement is desired.

PRIOR ART DOCUMENTS

Patent Documents

Patent Document 1: Japanese Unexamined Patent Application Publication No. H4-170449A
Patent Document 2: Japanese Unexamined Patent Application Publication No. H11-323024A
Patent Document 3: Japanese Unexamined Patent Application Publication No. 2000-169628A

SUMMARY OF THE INVENTION

Problem to be Solved by the Invention

Therefore, an object of the present invention is to provide a rubber composition with which it is possible to produce a tire that retains wear resistance and has excellent frictional force on ice, and a pneumatic tire using the rubber composition.

Means to Solve the Problem

As a result of extensive study in order to solve the above-mentioned problem, the inventors completed the present invention upon discovering that by using a rubber composition wherein a specific amount of a master batch, which has been prepared by premixing at least a non-diene rubber and an organic peroxide, is added to a diene rubber, it is possible to produce a tire that retains wear resistance and has excellent frictional force on ice.

Specifically, the present invention provides the following (1) to (10).

(1) A rubber composition comprising: a diene rubber, a carbon black and/or a white filler, and a master batch prepared by premixing a non-diene rubber and an organic peroxide, wherein
  a total content of the carbon black and the white filler is from 20 to 70 parts by mass per 100 parts by mass of the diene rubber and
  a content of the non-diene rubber in the master batch is from 3 to 30 parts by mass per 100 parts by mass of the diene rubber.

(2) The rubber composition according to above-mentioned (1), further comprising an ester plasticizer.

(3) The rubber composition according to above-mentioned (2), wherein the master batch is a master batch prepared by premixing the non-diene rubber, the organic peroxide and the ester plasticizer.

(4) The rubber composition according to any of above-mentioned (1) to (3), wherein an average glass transition temperature of the diene rubber is −50° C. or lower.

(5) The rubber composition according to any of above-mentioned (2) to (4), wherein an average glass transition temperature of the ester plasticizer is −50° C. or lower.

(6) The rubber composition according to any of above-mentioned (2) to (5), wherein the ester plasticizer has a saturated cyclic structure represented by the following formula (I):

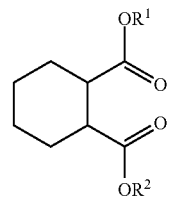

(I)

(in the formula, $R^1$ and $R^2$ are each independently a hydrogen atom or an organic group having from 1 to 18 carbons).

(7) The rubber composition according to any of above-mentioned (1) to (6), wherein a content of the organic peroxide is from 0.1 to 10 parts by mass per 100 parts by mass of the non-diene rubber.

(8) The rubber composition according to any of above-mentioned (2) to (7), wherein a content of the ester plasticizer is from 10 to 100 parts by mass per 100 parts by mass of the non-diene rubber.

(9) The rubber composition according to any of above-mentioned (1) to (8), wherein a temperature at which the half-life of the organic peroxide becomes one minute is 120° C. or higher.

(10) A pneumatic tire having a tread portion that is formed using the rubber composition described in any of above-mentioned (1) to (9).

Effect of the Invention

As shown below, by means of the present invention, it is possible to provide a rubber composition with which it is possible to produce a tire that retains wear resistance and has excellent frictional force on ice, and a pneumatic tire using the rubber composition.

BRIEF DESCRIPTION OF THE DRAWINGS

FIG. 1 is a partial cross-sectional schematic view of a tire that represents one embodiment of the tire of the present invention.

BEST MODE FOR CARRYING OUT THE INVENTION

Rubber Composition for Use in Tires

The rubber composition of the present invention is a rubber composition comprising a diene rubber, a carbon black and/or a white filler, and a master batch prepared by premixing a non-diene rubber and an organic peroxide, wherein a total content of the carbon black and the white filler is from 20 to 70 parts by mass per 100 parts by mass of the diene rubber and a content of the non-diene rubber in the master batch is from 3 to 30 parts by mass per 100 parts by mass of the diene rubber, and is suitable for use in the tread of a pneumatic studless tire.

The components contained in the rubber composition of the present invention will now be explained in detail.

<Diene Rubber>

There are no particular restrictions to the diene rubber contained in the rubber composition of the present invention as long as it has double bonds in its main chain, and specific examples thereof are natural rubber (NR), isoprene rubber (IR), styrene-butadiene rubber (SBR), butadiene rubber (BR), chloroprene rubber (CR), acrylonitrile butadiene rubber (NBR), styrene-isoprene rubber, isoprene-butadiene rubber, nitrile rubber, and hydrogenated nitrile rubber. One of these diene rubbers can be used alone, or a combination of two or more of these diene rubbers can be used.

Of these, preferably natural rubber (NR), isoprene rubber (IR), styrene-butadiene rubber (SBR), or butadiene rubber (BR) is used because wear resistance is improved and low temperature resistance (the property whereby the rubber compound retains pliability under) will also be enhanced. It is more preferably to use the natural rubber (NR) and the butadiene rubber (BR) in combination.

A natural rubber standardized by the Green Book (International Standards of Quality and Packing for Natural Rubber Grades) can be used as the natural rubber (NR).

Preferably, a rubber having a specific gravity of 0.91 to 0.94 and a Mooney viscosity [$ML_{1+4}$ (100° C.), JIS K6300] of 30 to 120 is used as the isoprene rubber (IR).

Preferably, a rubber having a specific gravity of 0.91 to 0.98 and a Mooney viscosity [$ML_{1+4}$ (100° C.), JIS K6300] of 20 to 120 is used as the styrene-butadiene rubber (SBR).

Preferably, a rubber having a specific gravity of 0.90 to 0.95 and a Mooney viscosity [$ML_{1+4}$ (100° C.), JIS K6300] of 20 to 120 is used as the butadiene rubber (BR).

According to the present invention, preferably the average glass transition temperature of the diene rubber is −50° C. or lower. When the average glass transition temperature of the diene rubber is −50° C. or lower, it is possible to maintain a low tire hardness, even under low temperatures, and performance on ice (particularly frictional force on ice) is improved. Moreover, more preferably, the average glass transition temperature is −55° C. or lower because performance on ice is further improved.

Here, the glass transition temperature is the value determined at a temperature elevation speed of 10° C./min in accordance with ASTMD3418-82 using a differential scanning calorimeter (DSC) manufactured by DuPont.

The average glass transition temperature is the average value of the glass transition temperature, and when only one type of diene rubber is used, refers to the glass transition temperature of that diene rubber, while when a combination of two or more types of diene rubbers is used, refers to the glass transition temperature of the entire diene rubber (mixture of each diene rubber) and can be calculated as the average value from the glass transition temperature of each diene rubber and the compounding ratio of each diene rubber.

<Carbon Black/White Filler>

There are no particular restrictions to the carbon black and/or white filler contained in the rubber composition of the present invention and, as will be described later, the carbon blacks and white fillers added to conventional rubber compositions for tires are specific examples that can be appropriately used.

(Carbon Black)

Specific examples of the carbon black are furnace carbon blacks such as SAF, ISAF, HAF, FEF, GPE, and SRF, and one of these can be used alone, or a combination of two or more can be used.

Moreover, the carbon black is preferably one having a nitrogen specific surface area ($N_2SA$) of 20 to 200 $m^2/g$, and more preferably 40 to 150 $m^2/g$ in terms of workability when the rubber composition of the present invention is mixed, the ability to reinforce the pneumatic tire of the present invention, and the like. Note that the nitrogen specific surface area is measured in accordance with JIS K6217-2.

(White Filler)

Specific examples of the white filler are silica, calcium carbonate, magnesium carbonate, talc, clay, alumina, aluminum hydroxide, titanium oxide, and calcium sulfate. One of these can be used alone, or a combination of two or more can be used.

Of these, silica is preferred because the frictional force on ice of the pneumatic tire of the present invention is improved.

Specific examples of the silica are wet silica (hydrous silicic acid), dry silica (silicic anhydride), calcium silicate, and aluminum silicate. One of these can be used alone, or a combination of two or more can be used.

Of these, wet silica is preferred because wear resistance of the pneumatic tire of the present invention is enhanced, frictional force on ice is further improved, failure characteristics are also improved, and the combined effect of wet grip performance and low rolling resistance is excellent.

According to the present invention, the total content of the carbon black and/or white filler per 100 parts by mass of the diene rubber is from 20 to 70 parts by mass, preferably from 30 to 70 parts by mass, because wear resistance is enhanced and frictional force on ice is improved.

<Master Batch>

The master batch contained in the rubber composition of the present invention is a master batch prepared by premixing at least a non-diene rubber and an organic peroxide.

According to the present invention, by compounding such a master batch, the obtained pneumatic tire of the present invention retains wear resistance and has improved frictional force on ice.

This is apparently due to the fact that the master batch has a different polarity than the diene rubber and the master batch itself forms a pliable body as a result of crosslinking by the organic peroxide. Therefore, the pliable body tends toward being present near the tire tread surface, and as a result, the surface roughness of the tire tread increases. Moreover, the effect of an increase in the surface roughness of the tire tread is retained, even after the pliable body peels off.

(Non-Diene Rubber)

The non-diene rubber refers to rubber that is not covulcanized with the diene rubber, specifically, rubber that does not have double bonds and is not sulfur vulcanized. Specific examples are ethylene propylene rubber (EPM), ethylene butene rubber (EBM), propylene butene rubber (PBM), fluorine rubber (FKM), epichlorohydrin rubber (CO, ECO), acrylic rubber (ACM), chlorinated polyethylene (CM), chlorosulfonated rubber (CSM), silicone rubber (Q), and urethane rubber (U). One of these can be used alone, or a combination of two or more can be used.

Of these, ethylene propylene rubber (EPM), ethylene butene rubber (EBM), and propylene butene rubber (PBM)

are preferred, and ethylene propylene rubber (EPM) is more preferred, because the average glass transition temperature is −50° C. or lower.

According to the present invention, the content of the non-diene rubber in the master batch per 100 parts by mass of the diene rubber is from 3 to 30 parts by mass, preferably from 5 to 25 parts by mass, because wear resistance is enhanced and frictional force on ice is improved.

(Organic Peroxide)

The organic peroxide can be one that is usually used for peroxide vulcanization of rubber. Specific examples are dicumyl peroxide, di-t-butyl peroxide, t-butyl cumyl peroxide, benzoyl peroxide, 2,5-dimethyl-2,5-di(t-butylperoxy)hexyne-3,2,5-dimethyl-2,5-di(benzoylperoxy)hexane, 2,5-dimethyl-2,5-mono(t-butylperoxy)hexane, and bis(tert-butyldioxyisopropyl)benzene. One of these can be used alone or a combination of two or more can be used.

In terms of dispersibility of the master batch (pliable body), the non-diene rubber should be crosslinked during vulcanization of the diene rubber and therefore, of these, the preferred organic peroxide is one having a temperature at which half-life becomes one minute (hereafter in this paragraph referred to as "cleavage temperature") of 120° C. or higher, specifically 1,1-bis(tert-butylperoxy)cyclohexane (cleavage temperature of 149° C.), 2,5-dimethyl-2,5-di(t-butylperoxy)hexane (cleavage temperature of 179° C., bis(tert-butyldioxyisopropyl)benzene (cleavage temperature of 175° C.), and the like.

Here, half-life refers to the time until the concentration of the organic peroxide decreases to half the initial concentration, and the temperature at which half-life becomes one minute refers to the temperature at which the time required to reach the half-life is one minute.

In terms of crosslinking the non-diene rubber in the master batch after mixing with the diene rubber, and the like, the organic peroxide content is preferably from 0.1 to 10 parts by mass, and more preferably from 0.5 to 7.0 parts by mass, per 100 parts by mass of the non-diene rubber.

Note that, preferably, the organic peroxide content is from 0.003 to 3 parts by mass per 100 parts by mass of the diene rubber.

According to the present invention, in addition to the non-diene rubber, the organic peroxide, and optionally added ester plasticizer described later, the master batch can contain various additives generally used in rubber compositions for tires, such as zinc oxide, oils, antiaging agents, and plasticizers.

According to the present invention, there are no particular restrictions to the method for preparing the master batch, and an example is the method whereby each of the above-mentioned components is kneaded using a publicly known method and device (such as a Banbury mixer, kneader, or roll).

<Ester Plasticizer>

In terms of the frictional force on ice of the pneumatic tire, preferably the rubber composition of the present invention contains an ester plasticizer.

According to the present invention, when the rubber composition contains an ester plasticizer, preferably the master batch is a master batch that is prepared by premixing the non-diene rubber, the organic peroxide, and the ester plasticizer.

The frictional force on ice of the obtained pneumatic tire of the present invention is improved by adding a master batch in which the ester plasticizer has been premixed.

This is apparently because by using the master batch, the effect of selective plasticization of the rubber matrix by the ester plasticizer can be obtained and low-temperature pliability of the non-diene rubber in the compound can be guaranteed because the glass transition temperature of the ester plasticizer is also reduced.

There are no particular restrictions to the ester plasticizer and specific examples thereof are phthalic acid esters, adipic acid esters, sebacic acid esters, trimellitic acid esters, orthophosphoric acid esters, and cyclohexanedicarboxylic acid esters having a saturated cyclic structure represented by the following formula (I):

(in the formula, $R^1$ and $R^2$ are each independently a hydrogen atom or an organic group having from 1 to 18 carbons).

According to the present invention, preferably the average glass transition temperature of the ester plasticizer is −50° C. or lower. When the average glass transition temperature of the ester plasticizer is −50° C. or lower, a low tire hardness can be maintained, even under low temperatures, and performance on ice (particularly frictional force on ice) is improved. More preferably, the average glass transition temperature of the ester plasticizer is −55° C. or lower because performance on ice is further improved.

The glass transition temperature here is the value determined by the same method as used for the diene rubber.

According to the present invention, preferably the ester plasticizer is a cyclohexanedicarboxylic acid ester having a saturated cyclic structure represented by formula (I) because the obtained pneumatic tire of the present invention retains wear resistance and has further improved frictional force on ice.

Examples of the organic groups having from 1 to 18 carbons of $R^1$ and $R^2$ in formula (1) are monovalent aliphatic hydrocarbon groups optionally having hetero atoms. A specific suitable example is an alkyl group optionally having a branched or cyclic (bicyclic) structure.

The number of carbons in such an alkyl group is preferably from 2 to 18, more preferably from 4 to 12, and further preferably from 4 to 9.

Specific examples of compounds represented by formula (I) are compounds represented by formula (II):

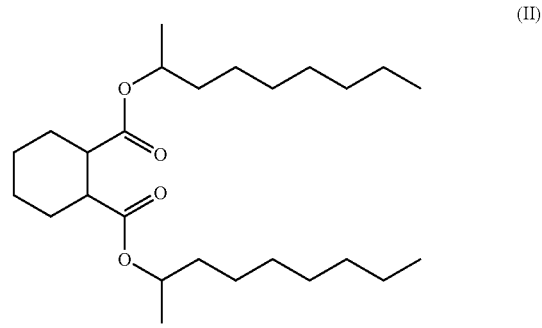 [SMILES: CCCCCCCC(C)OC(=O)C1CCCCC1C(=O)OC(C)CCCCCCC]

In terms of obtaining the effect of selective plasticizing of the rubber matrix, the content of the ester plasticizer is preferably from 10 to 100 parts by mass, and more preferably from 20 to 80 parts by mass, per 100 parts by mass of the non-diene rubber in the master batch.

Note that the content of the ester plasticizer is preferably from 0.5 to 30 parts by mass per 100 parts by mass of the diene rubber.

<Silane Coupling Agent>

In terms of dispersing the white filler (particularly silica) and improving properties such as tensile strength and elongation breakage after vulcanization, the rubber composition of the present invention contains preferably from 0.1 to 10 parts by mass, and further preferably from 1 to 10 parts by mass, of silane coupling agent per 100 parts by mass of the white filler.

Specific examples of the silane coupling agent are bis-[3-(triethoxysilyl)-propyl]tetrasulfide, bis-[3-(trimethoxysilyl)-propyl]tetrasulfide, bis-[3-(triethoxysilyl)-propyl]disulfide, mercaptopropyl-trimethoxysilane, mercaptopropyl-triethoxysilane, 3-trimethoxysilylpropyl-N,N-dimethylthiocarbamoyl-tetrasulfide, trimethoxysilylpropyl-mercaptobenzothiazole tetrasulfide, triethoxysilylpropyl-methacrylate-monosulfide, and dimethoxymethylsilylpropyl-N,N-dimethylthiocarbamoyl-tetrasulfide. One of these can be used alone, or a combination of two or more can be used.

In addition to the above-mentioned components, the rubber composition of the present invention can contain a variety of additives generally used in rubber compositions for tires, such as fillers other than carbon black and silica (such as calcium carbonate), vulcanizing agents or crosslinking agents, vulcanization accelerators or crosslinking accelerators, zinc oxide, oils, antiaging agents, and plasticizers. Compounded amounts of these additives may be any conventional amount, so long as the object of the present invention is not hindered.

There are no particular restrictions to the method for producing the rubber composition of the present invention, and an example is the method whereby each of the above-mentioned components is kneaded using a publicly known method and device (such as a Banbury mixer, kneader, or roll).

In addition, the rubber composition of the present invention can be vulcanized or crosslinked under conventional, publicly known vulcanizing or crosslinking conditions.

[Tire]

The pneumatic tire of the present invention is a tire having a tread portion formed from the rubber composition for a tire of the present invention.

FIG. 1 is a partial cross-sectional schematic view of a tire that represents one embodiment of the pneumatic tire of the present invention, but the pneumatic tire of the present invention is not limited to the mode illustrated in FIG. 1.

In FIG. 1, 1 represents a bead portion, 2 represents a side wall portion, and 3 represents a tread portion formed from the rubber composition for a tire of the present invention.

In addition, a carcass layer 4, in which a fiber cord is embedded, is mounted between a left-right pair of bead portions 1, and ends of the carcass layer 4 are wound by being folded around bead cores 5 and a bead filler 6 from an inner side to an outer side of the tire.

Also, in the tread 3, a belt layer 7 is provided along an entire periphery of the tire 1 on an outer side of the carcass layer 4.

Additionally, rim cushions 8 are provided in parts of the bead portions 1 that are in contact with a rim.

The pneumatic tire of the present invention can be produced by, for instance, forming a tread portion by vulcanization or crosslinking at a temperature corresponding to the type and compounding ratio of the diene rubber, vulcanizing agent or crosslinking agent, and vulcanization or crosslinking accelerator used in the rubber composition of the present invention.

EXAMPLES

The present invention is described below in detail using working examples. But it is in no way limited to these examples.

(Preparation of EPM Master Batch 1)

EPM master batch 1 was prepared by mixing 100 parts by mass of ethylene propylene rubber (EP11, manufactured by JSR Corporation), 5 parts by mass of an organic peroxide (brand name: Perkadox 14-40, bis(tert-butyldioxyisopropyl)benzene content: 40 mass %, temperature at which half-life becomes one minute: 175° C., manufactured by Kayaku Akzo Corporation), 1.0 part by mass of zinc oxide (zinc oxide No. 3, manufactured by Seido Chemical Industry Ltd.), and 5 parts by mass of stearic acid (stearic acid beads, manufactured by Nippon Oil & Fats Co., Ltd.), for 4 minutes and 30 seconds under conditions of 140° C. or lower using a 1.5 liter continuous mixer.

(Preparation of EPM Master Batch 2)

EPM master batch 2 was prepared by mixing 100 parts by mass of ethylene propylene rubber (EP11, manufactured by JSR Corporation), 5 parts by mass of an organic peroxide (brand name: Perkadox 14-40, bis(tert-butyldioxyisopropyl)benzene content: 40 mass %, temperature at which half-life becomes one minute: 175° C., manufactured by Kayaku Akzo Corporation), 1.0 part by mass of zinc oxide (zinc oxide No. 3, manufactured by Seido Chemical Industry Ltd.), 5 parts by mass of stearic acid (stearic acid beads, manufactured by Nippon Oil & Fats Co., Ltd.), and 19 parts by mass of the compound represented by above-mentioned formula (II) (Hexamoll DINCH, manufactured by BASF), for 4 minutes and 30 seconds under conditions of 140° C. or lower using a 1.5 liter continuous mixer.

Working Examples 1 to 8 and Comparative Examples 1 to 7

The components shown in Table 1 below were blended at the proportions (parts by mass) shown in Table 1 below.

Specifically, a master batch was obtained by first kneading the components shown in Table 1 below, except for the sulfur and the vulcanization accelerator, for 5 minutes in a 2 liter closed type mixer, and then discharging the kneaded product when the temperature reached 150° C.

Next, a rubber composition was obtained by kneading the sulfur and the vulcanization accelerator with the obtained master batch using an open roll.

A vulcanized rubber sheet was then produced by vulcanizing the obtained rubber composition for 15 minutes at 170° C. in a mold for Lambourn abrasion (disk having a diameter of 63.5 mm and thickness of 5 mm).

<Index of Coefficient of Friction on Ice>

The vulcanized rubber sheet produced as described above was bonded to a substrate rubber in the form of a flat column and the coefficient of friction on ice was determined by an inside drum-type friction on ice tester under conditions of a determination temperature of −1.5° C., a load of 5.5 kg/cm$^3$, and a rotation speed of drum of 25 km/hour.

The index of the coefficient of friction on ice is the coefficient of friction on ice converted to an index by the following formula with the coefficient of friction on ice of comparative example 1 serving as 100. The frictional force between the rubber and ice improves as the numerical value increases.

Index of coefficient of friction on ice=(coefficient of friction on ice of sample/coefficient of friction on ice of comparative example 1)×100

<Wear Resistance>

The vulcanized rubber sheet produced as described above was subjected to determination in accordance with JIS K6264 under conditions of a load of 4.0 kg and a slip rate of 30% using a Lambourn abrasion tester (manufactured by Iwamoto Seisakusyo K.K.) and the amount of wear of the sample was measured.

The wear resistance was the amount of wear of the sample converted to an index by the following formula, with the amount of wear of comparative example 1 serving as 100. A higher numerical value indicates a superior wear resistance Wear resistance=(amount of wear of comparative example 1/amount of wear of sample)×100

TABLE 1

|  | Comparative Example | | | | | | |
|---|---|---|---|---|---|---|---|
|  | 1 | 2 | 3 | 4 | 5 | 6 | 7 |
| Natural rubber | 50 | 50 | 50 | 50 | 50 | 50 | 50 |
| Butadiene rubber | 50 | 50 | 50 | 50 | 50 | 50 | 50 |
| Carbon black | 35 | 35 | 35 | 35 | 35 | 35 | 35 |
| Silica | 25 | 25 | 25 | 25 | 25 | 25 | 25 |
| Silane coupling agent | 2 | 2 | 2 | 2 | 2 | 2 | 2 |
| Zinc oxide | 4 | 4 | 4 | 4 | 4 | 4 | 4 |
| Stearic acid | 2 | 2 | 2 | 2 | 2 | 2 | 2 |
| Antiaging agent | 2 | 2 | 2 | 2 | 2 | 2 | 2 |
| Wax | 2 | 2 | 2 | 2 | 2 | 2 | 2 |
| Process oil | 20 | 20 | 20 | 20 | 20 | 20 | 20 |
| EPM master batch 1 | — | 1 | 40 | — | — | — | — |
| EPM master batch 2 | — | — | — | — | — | 1 | 45.5 |
| EPM | — | — | — | 10 | 10 | — | — |
| Organic peroxide 1 | — | — | — | — | 1 | — | — |
| Ester plasticizer | — | — | — | — | — | — | — |
| Sulfur | 1.5 | 1.5 | 1.5 | 1.5 | 1.5 | 1.5 | 1.5 |
| Vulcanization accelerator | 1.5 | 1.5 | 1.5 | 1.5 | 1.5 | 1.5 | 1.5 |
| Index of coefficient of friction on ice | 100 | 100 | 95 | 104 | 99 | 100 | 105 |
| Wear resistance | 100 | 100 | 94 | 96 | 96 | 100 | 92 |

|  | Working Examples | | | | | | | |
|---|---|---|---|---|---|---|---|---|
|  | 1 | 2 | 3 | 4 | 5 | 6 | 7 | 8 |
| Natural rubber | 50 | 50 | 50 | 50 | 50 | 50 | 50 | 50 |
| Butadiene rubber | 50 | 50 | 50 | 50 | 50 | 50 | 50 | 50 |
| Carbon black | 35 | 35 | 35 | 35 | 35 | 35 | 35 | 35 |
| Silica | 25 | 25 | 25 | 25 | 25 | 25 | 25 | 25 |
| Silane coupling agent | 2 | 2 | 2 | 2 | 2 | 2 | 2 | 2 |
| Zinc oxide | 4 | 4 | 4 | 4 | 4 | 4 | 4 | 4 |
| Stearic acid | 2 | 2 | 2 | 2 | 2 | 2 | 2 | 2 |
| Antiaging agent | 2 | 2 | 2 | 2 | 2 | 2 | 2 | 2 |
| Wax | 2 | 2 | 2 | 2 | 2 | 2 | 2 | 2 |
| Process oil | 20 | 20 | 20 | 20 | 19 | 18 | 16 | 18 |
| EPM master batch 1 | 5 | 10 | 20 | 30 | — | — | — | 10 |
| EPM master batch 2 | — | — | — | — | 6.5 | 13 | 26 | — |
| EPM | — | — | — | — | — | — | — | — |
| Organic peroxide 1 | — | — | — | — | — | — | — | — |
| Ester plasticizer | — | — | — | — | — | — | — | 1.9 |
| Sulfur | 1.5 | 1.5 | 1.5 | 1.5 | 1.5 | 1.5 | 1.5 | 1.5 |
| Vulcanization accelerator | 1.5 | 1.5 | 1.5 | 1.5 | 1.5 | 1.5 | 1.5 | 1.5 |
| Index of coefficient of friction on ice | 104 | 115 | 112 | 108 | 107 | 121 | 117 | 115 |
| Wear resistance | 100 | 101 | 101 | 100 | 100 | 101 | 101 | 100 |

The components shown in Table 1 are as follows.
Natural rubber: RSS#3
Butadiene rubber: Nipol BR 1220 (manufactured by Zeon Corporation)
Carbon black: SEAST 6 (manufactured by Tokai Carbon Co., Ltd.)
Silica: Nipsil AQ (manufactured by Japan Silica Industry Co., Ltd.)
Silane coupling agent: Si69 (manufactured by Degussa AG)
Zinc oxide: Zinc oxide No. 3 (manufactured by Seido Chemical Industry Ltd.)
Stearic acid: stearic acid beads (manufactured by Nippon Oil & Fats Co., Ltd.)
Antiaging agent: N-phenyl-N'-(1,3-dimethylbutyl)-p-phenylenediamine (Santoflex 6PPD, manufactured by Flexsys)
Wax: Paraffin wax (manufactured by Ouchi Shinko Chemical Industrial Co., Ltd.)
Process oil: Extract No. 4 S (manufactured by Showa Shell Seikyu K.K.)
Sulfur: "Golden Flower" oil-treated sulfur powder (manufactured by Tsurumi Chemical Industry Co., Ltd.)
Vulcanization accelerator: N-cyclohexyl-2-benzothiazolyl sulfenamide (NOCCELER CZ-G, manufactured by Ouchi Shinko Chemical Industrial Co., Ltd.)
EPM master batch 1: Prepared by above-mentioned method
EPM master batch 2: Prepared by above-mentioned method
EPM: EP11 (manufactured by JSR Corporation)
Organic peroxide 1: Perkadox 14-40, (bis(tert-butyldioxyisopropyl)benzene content: 40 mass %, temperature at which half-life becomes one minute: 175° C., manufactured by Kayaku Akzo Corporation)
Ester plasticizer: Compound represented by formula (II) (Hexamoll DINCH, manufactured by BASF)

Based on the results shown in Table 1, it was clear that the rubber composition of comparative example 2, to which had been added a small amount of master batch prepared by premixing a non-diene rubber and an organic peroxide, merely performed on the same level as the rubber composition of comparative example 1, and that the rubber composition of comparative example 3, to which an excess amount of the above-mentioned master batch had been added, had wear resistance and frictional force on ice that were yet inferior to the rubber composition of comparative example 1. It was also evident that the same results as with comparative examples 2 and 3 were obtained with comparative examples 6 and 7, which had been prepared by premixing the non-diene rubber and organic peroxide together with an ester plasticizer.

In addition, it was clear that the rubber composition of comparative example 4, which was prepared by adding a non-diene rubber alone, had better frictional force on ice, but worse wear resistance, and it was clear that the rubber composition of comparative example 5, which was prepared by separately adding a non-diene rubber and an organic peroxide, had worse wear resistance and frictional force on ice.

In contrast to this, it was clear that by using a rubber composition to which was added a specific amount of a master batch prepared by premixing a non-diene rubber and an organic peroxide with a diene rubber, it was possible to produce a tire that retained wear resistance and had excellent frictional force on ice when compared to the rubber composition of comparative example 1 (Working Examples 1 to 4 and 8).

Similarly, it was clear that by using a rubber composition to which was added a specific amount of a master batch prepared by premixing a non-diene rubber and an organic peroxide together with an ester plasticizer, it was possible to produce a tire that retained wear resistance and had excellent frictional force on ice. This rubber composition was extremely useful because frictional force on ice was superior even to that of working examples 1 to 3 to which the same amount of non-diene rubber had been added and working example 8 to which ester plasticizer had been separately added.

REFERENCE NUMERALS

1 Bead portion
2 Side wall portion
3 Tread portion formed from rubber composition for a tire of the present invention
4 Carcass layer
5 Bead core
6 Bead filler
7 Belt layer
8 Rim cushion

What is claimed is:

1. A rubber composition comprising: a diene rubber, a carbon black and/or a white filler, and a masterbatch prepared by premixing a non-diene rubber and an organic peroxide, and an ester plasticizer, wherein
    a total content of the carbon black and the white filler is from 30 to 60 parts by mass per 100 parts by mass of the diene rubber, and
    the non-diene rubber is at least one of ethylene propylene rubber, ethylene butene rubber and propylene butene rubber and a content of the non-diene rubber in the masterbatch is from 5 to 30 parts by mass per 100 parts by mass of the diene rubber, and
    the peroxide is selected from the group consisting of 1,1-bis(tert-butylperoxy)cyclohexane, 2,5-di(t-butylperoxy)hexane, bis(tertbutyldioxyisopropyl)benzene and mixtures thereof and a content of the peroxide is from 0.5 to 7 parts by mass per 100 parts by mass of the non-diene rubber,
    the ester plasticizer is a cyclohexanedicarboxylic acid ester having a saturated cyclic structure represented by the following formula:

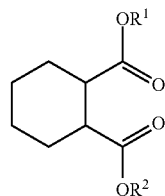

(I)

wherein, $R^1$ and $R^2$ are monovalent aliphatic hydrocarbon groups comprising an alkyl group having a branched or cyclic structure wherein the alkyl group has from 4 to 9 carbon atoms and optionally including heteroatoms, and the glass transition temperature of the plasticizer is $-50°$ C. or lower,
    and a content of the ester plasticizer is from 1.9 to 30 parts by mass per 100 parts by mass of the diene rubber,
    and a content of the ester plasticizer is from 10 to 100 parts by mass per 100 parts by mass of the non-diene rubber, and
    wherein the diene rubber is at least one of natural rubber, isoprene rubber, styrene-butadiene rubber, and butadiene rubber, wherein a vulcanized rubber is prepared with the rubber composition.

2. A pneumatic tire having a tread portion comprising the rubber composition described in claim 1.

* * * * *